United States Patent
Yoshizaki

(10) Patent No.: US 7,367,323 B2
(45) Date of Patent: May 6, 2008

(54) EIGHT-CYLINDER ENGINE

(75) Inventor: Kouji Yoshizaki, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 93 days.

(21) Appl. No.: 10/577,937

(22) PCT Filed: Mar. 18, 2005

(86) PCT No.: PCT/JP2005/005616

§ 371 (c)(1),
(2), (4) Date: May 3, 2006

(87) PCT Pub. No.: WO2005/106228

PCT Pub. Date: Nov. 10, 2005

(65) Prior Publication Data

US 2007/0034177 A1   Feb. 15, 2007

(30) Foreign Application Priority Data

Apr. 27, 2004   (JP)   ............... 2004-131462

(51) Int. Cl.
*F02D 41/38*   (2006.01)
*F02B 75/22*   (2006.01)
(52) U.S. Cl. .................. 123/490; 123/54.7
(58) Field of Classification Search ........ 123/478, 123/480, 481, 490, 691, 692, 198 F, 54.4, 123/54.7; 701/104
See application file for complete search history.

(56) References Cited

U.S. PATENT DOCUMENTS

| | | | | |
|---|---|---|---|---|
| 4,116,172 A | | 9/1978 | Löhr et al. | |
| 5,485,820 A | * | 1/1996 | Iwaszkiewicz | 123/458 |
| 5,515,829 A | * | 5/1996 | Wear et al. | 123/446 |
| 5,560,825 A | * | 10/1996 | Shafer | 210/430 |
| 5,692,375 A | | 12/1997 | Novak et al. | |
| 5,738,071 A | * | 4/1998 | Smith et al. | 123/357 |
| 5,934,258 A | | 8/1999 | Watanabe | |
| 5,960,627 A | | 10/1999 | Krampe et al. | |
| 2004/0030488 A1 | | 2/2004 | Moessinger et al. | |

FOREIGN PATENT DOCUMENTS

| | | |
|---|---|---|
| JP | A-2001-295685 | 10/2001 |
| JP | A-2003-056386 | 2/2003 |

* cited by examiner

Primary Examiner—Willis R. Wolfe, Jr.
Assistant Examiner—Johnny H. Hoang
(74) Attorney, Agent, or Firm—Oliff & Berridge, PLC

(57) ABSTRACT

An eight-cylinder engine including fuel injection valves provided for each of the eight cylinders. A first valve drive unit for driving four of the eight fuel injection valves to open and close by energizing the four fuel injection valves and a second valve drive unit for driving the other four fuel injection valves to open and close by energizing the second-mentioned four fuel injection valves. Both of the valve drive units drive the fuel injection valves so that combustion and expansion strokes occur at equal intervals, thus allowing for a sufficient charging time for each valve drive unit. For example, the first valve drive unit energizes those fuel injection valves which are provided on a first, fourth, sixth and seventh cylinders, and the second valve drive unit energizes those fuel injection valves which are provided on a second, third, fifth, and eighth cylinders.

1 Claim, 8 Drawing Sheets

| CRANK ANGLE(°) | 0 | 180 | 360 | 540 | 720 |
|---|---|---|---|---|---|
| LEFT BANK | #1 | | #3 | #5 | #7 | |
| RIGHT BANK | | #8 | #4 | #6 | | #2 |

FIG.3

| CRANK ANGLE(°) | 0 | 180 | 360 | 540 | 720 |
|---|---|---|---|---|---|
| LEFT BANK | #1 | #7 | | #5 | | #3 |
| RIGHT BANK | | #8 | #2 | #6 | #4 | |

FIG.4

| | CRANK ANGLE (°) | | | | | | | |
|---|---|---|---|---|---|---|---|---|
| | 0 | 180 | | 360 | | 540 | | 720 |
| LEFT BANK | #1 | | #7 | #3 | | #5 | | |
| RIGHT BANK | | #8 | | | #6 | | #4 | #2 |

FIG.5

| | CRANK ANGLE (°) | | | | | | | |
|---|---|---|---|---|---|---|---|---|
| | 0 | 180 | | 360 | | 540 | | 720 |
| LEFT BANK | #1 | #5 | | #3 | | | #7 | |
| RIGHT BANK | | | #4 | | #6 | #8 | | #2 |

FIG.6

EIGHT-CYLINDER ENGINE

TECHNICAL FIELD

The present invention relates to an eight-cylinder engine, and in particular, to a fuel injection system thereof.

PRIOR ART

An engine, in particular a diesel engine, installed on a motor vehicle or the like is provided with an electronically controlled fuel injection system which includes fuel injection valves each mounted on the combustion chamber of each cylinder, a common rail for accumulating high-pressure fuel, a high-pressure pump for pressurizing the fuel drawn up from a fuel tank so as to discharge it to the common rail, and an electronic control unit (ECU) for electronically controlling a plurality of fuel injection valves and the high-pressure pump (see, for example, a first patent document: Japanese patent application laid-open No. 2001-295685).

The fuel injection valves are mounted on the combustion chambers, respectively, of the individual cylinders of the engine for injecting the high-pressure fuel to the combustion chambers of the engine, respectively, and the amount of fuel injected into each combustion chamber, the fuel injection timing and the like are determined by electronically controlling the energization and deenergization of an actuator in the form of an electromagnetic valve in each fuel injection valve.

However, in case where fuel is injected into each combustion chamber, a space into which fuel is injected is one defined by a cylinder block, a piston, a cylinder head, etc., so considering that injections are carried out during the compression stroke, it is necessary to perform such injections under very high pressure. In addition, there is no spatial and time room for fuel to sufficiently diffuse after the injection thereof. Accordingly, in order to obtain an appropriate combustion condition under such circumstances, it is necessary to raise the pressure of the fuel supplied to the fuel injection valves so that the fuel can be satisfactorily diffused from the moment of being injected into the cylinders. To this end, it is necessary not only to drive the fuel injection valves at high speed against such a high fuel pressure, but also to control the fuel injection timing in an accurate manner. Thus, a high voltage is required to be impressed on the actuators in the form of the electromagnetic valves in a short time, so that a needle valve in each fuel injection valve is driven to open and close at high speed.

Therefore, the fuel injection valves are connected to a fuel injection valve drive unit (hereinafter referred to as "EDU (=Electronic Driver Unit)") that serves to generate the high voltage, so that the valve-opening timing and the valve-closing timing of each fuel injection valve are controlled by a valve drive unit in the form of the EDU on the basis of the fuel injection control of the ECU.

It is necessary to charge the EDU to a satisfactory extent so as to energize the fuel injection valves. Thus, enough time is required to charge the EDU before reenergization thereof after the EDU has energized the fuel injection valves. If sufficient time to charge the EDU can be ensured before its reenergization after the EDU has once performed energization, the energization of the fuel injection valves for the respective cylinders of the multi-cylinder engine can be achieved by the single EDU.

FIG. 7 illustrates a drive pulse output from an EDU to fuel injection valves in a four-stroke cycle engine with in-line four cylinders when a sub-injection such as a VIGOM-injection into which fuel is injected at the exhaust stroke, a post-injection into which fuel is injected at the combustion and expansion stroke, etc., is effected in addition to a main retarded injection of the engine in which combustion and expansion strokes occur in the order of the first cylinder (#1)→the third cylinder (#3)→the fourth cylinder (#4)→the second cylinder (#2).

This engine has four cylinders, and the combustion and expansion stroke takes place every crank angle of 180 degrees at equal intervals, so in case of such a multi-injection being carried out, there is enough time to charge the EDU before reenergization after energization has once been effected, and there will be no problem even with the use of the single EDU.

On the other hand, a V-type cylinder arrangement is often selected with engines having eight or more cylinders to shorten the total length of the engine, and in this case it can be considered that each of the V-shaped banks is provided with one EDU, which is connected to fuel injection valves for four cylinders on the corresponding bank, as shown in FIG. 8.

However, note that in the case of a V-type eight-cylinder engine, the combustion and expansion stroke starts at equal intervals for the engine as a whole, but if only one side of the V banks is taken, the combustion and expansion stroke might start at inequal intervals. For example, in the case of the V-type eight-cylinder engine with the cylinders arranged in a manner as shown in FIG. 8, it is preferable from the viewpoint of vibration that combustions be caused to occur, for example, in the order or sequence of cylinder #1→#2→#7→#3→#4→#5→#6→#8, as shown in FIG. 9.

When this combustion and expansion sequence is seen for the right bank and the left bank, respectively, it is in the order of cylinder #1→#7→#3→#5 on the left bank, and the interval is 180°→90°→180°→270°, whereas it is in the order of cylinder #2→#4→#6→#8 on the right bank, and the interval is 270°→180°→90°→180°. Thus, when attention is focused on each bank, combustions according to the main injection are generated at inequal intervals.

FIG. 10 illustrates a drive pulse output from the left bank EDU to the corresponding fuel injection valves when a multi-injection is carried out in the left bank cylinders. There is a period of time in which the interval of energization becomes short, as in an area indicated by an alternate long and two short dashes line in this figure, and it becomes impossible to ensure sufficient time to charge the EDU in this period of time. Thus, when the interval of energization is less than the time required for charging, the EDU is not charged to any satisfactory extent, so injection precision might be deteriorated, or injection timing might be restricted so as to ensure the energization interval equal to or more than the time required for charging. In particular, these problems become remarkable when the number of revolutions per minute of the engine is high.

DISCLOSURE OF THE INVENTION

Accordingly, the present invention has been made in view of the above-mentioned problems, and has for its object to provide an eight-cylinder engine which is capable of ensuring a charging time for EDUs (valve drive units) to a satisfactory extent even in a construction in which fuel injection valves for eight cylinders are energized by two EDUs (valve drive units).

In order to achieve the above object, there is provided an eight-cylinder engine according to the present invention which comprises: fuel injection valves provided one for each cylinder of the eight-cylinder engine for injecting fuel thereinto; a first valve drive unit for driving four of the eight fuel injection valves to open and close by energizing these four fuel injection valves; and a second valve drive unit for driving four fuel injection valves other than the first-mentioned four fuel injection valves to open and close by energizing these second-mentioned four fuel injection valves, characterized in that both of the valve drive units drive those fuel injection valves which are provided on cylinders for which combustion and expansion strokes occur at equal intervals.

In the case of the eight-cylinder engine, it is general that combustion and expansion strokes occur at equal intervals for the engine as a whole, and that combustions according to a main injection are also carried out at equal intervals.

In the eight-cylinder engine according to the present invention, the two valve drive units are provided, and the first valve drive unit drives those fuel injection valves to open and close which are provided on cylinders for which combustion and expansion strokes occur in the first, third, fifth and seventh order, and the second valve drive unit drives those fuel injection valves to open and close which are provided on cylinders for which combustion and expansion strokes occur in the second, fourth, sixth and eighth order. In this manner, both of the valve drive units drive those fuel injection valves to open and close which are provided on cylinders for which combustion and expansion strokes occur at equal intervals.

As a result, even when a multi-injection is carried out in which a post-injection, a VIGOM-injection and the like are effected in addition to a main injection, it is possible to ensure similar energization intervals as in the case of a four-cylinder engine in which all the fuel injection valves provided on four cylinders are driven to open and close by a single valve drive unit so that combustion and expansion strokes take place at equal intervals. Therefore, it is possible to ensure the time to charge the valve drive units to a satisfactory extent as in the case of the four-cylinder engine, or it is possible to suppress the fuel injection timing of the multi-injection from being restricted so as to ensure the time required to charge the valve drive units.

In addition, in an eight-cylinder engine in which when four cylinders are put into one cylinder group, two cylinder groups are arranged in a V-shaped configuration with fuel injection valves being provided for injecting fuel into the cylinders, respectively, in case where those cylinders which belong to one of the two cylinder groups are referred to, from one end to the other end, as a first cylinder, a third cylinder, a fifth cylinder and a seventh cylinder, and those cylinders which belong to the other of the two cylinder groups are referred to, from one end to the other end, as a second cylinder, a fourth cylinder, a sixth cylinder and an eighth cylinder, the engine is characterized by comprising: a first valve drive unit for driving those fuel injection valves to open and close which are provided on the first cylinder, the fourth cylinder, the sixth cylinder and the seventh cylinder by energizing these fuel injection valves; and a second valve drive unit for driving those fuel injection valves to open and close which are provided on the second cylinder, the third cylinder, the fifth cylinder and the eighth cylinder by energizing these fuel injection valves.

In the case of the V-type eight-cylinder engine, the combustion and expansion stroke starts at equal intervals for the entire engine, but when only those cylinders which belong to one of the cylinder groups are taken, it is preferable from the viewpoint of vibration that combustion and expansion strokes take place at inequal intervals whereas combustion and expansion timing be at inequal intervals. Accordingly, if all the fuel injection valves provided on those cylinders which belong to one cylinder group are driven to open and close by means of one valve drive unit, there will be a period of time in which the interval of energization of the valve drive unit becomes short, so it might become difficult to ensure sufficient time to charge the valve drive unit, or the fuel injection timing of the multi-injection might be restricted so as to ensure sufficient time to charge the valve drive unit.

On the other hand, in such a V-type eight-cylinder engine, it is preferable from the viewpoint of vibration that the combustion and expansion sequence be adjusted, for example, in the order of the first cylinder→the second cylinder→the seventh cylinder→the third cylinder→the fourth cylinder→the fifth cylinder→the sixth cylinder→the eighth cylinder, and that the intervals between adjacent or successive cylinders be all 90 degrees. However, when only those cylinders which belong to one of the cylinder groups are taken, the combustion and expansion sequence becomes in the order of the first cylinder (1st turn)→the seventh cylinder (3rd turn)→the third cylinder (4th turn)→the fifth cylinder (6th turn), so the intervals therebetween become $180°→90°→180°→270°$, and hence irregular or inequal.

In contrast to this, focusing attention on the fact that the intervals between the first cylinder (1st turn) and the seventh cylinder (3rd turn), between the seventh cylinder and the fourth cylinder (5th turn), and between the fourth cylinder and the sixth cylinder (7th turn) become an equal interval of 180°, one of the valve drive units is made to drive those fuel injection valves to open and close which are provided on the first cylinder, the fourth cylinder, the sixth cylinder and the seventh cylinder. By doing so, it is possible to drive the fuel injection valves which are provided on those cylinders for which combustion and expansion strokes occur at equal intervals, i.e., the combustion and expansion intervals according to the main injection become equal to one another.

Accordingly, in case where a multi-injection is carried out, it is possible to ensure similar energization intervals as in the case of a four-cylinder engine in which all the fuel injection valves provided on four cylinders are driven to open and close by a single valve drive unit so that combustion and expansion strokes take place at equal intervals. As a result, it is possible to ensure sufficient time to charge the valve drive units, or it is possible to suppress the fuel injection timing of the multi-injection from being restricted so as to ensure the time required to charge the valve drive units.

As described above, according to an eight-cylinder engine of the present invention, even in a construction in which fuel injection valves for eight cylinders are energized by two valve drive units (EDUs), a charging time for the valve drive units (EDUs) can be ensured to a satisfactory extent.

The above and other objects, features and advantages of the present invention will become more readily apparent to those skilled in the art from the following detailed description of a preferred embodiment of the present invention taken in conjunction with the accompanying drawings.

BRIEF DESCRIPTION OF THE DRAWINGS

FIG. 3 is a view showing a combustion and expansion sequence in an engine of a specification different from that of the engine 1 according to this embodiment.

FIG. 4 is a view showing a combustion and expansion sequence in an engine of another specification different from that of the engine 1 according to this embodiment.

FIG. 5 is a view showing a combustion and expansion sequence in an engine of a further specification different from that of the engine 1 according to this embodiment.

FIG. 6 is a view showing a combustion and expansion sequence in an engine of a yet further specification different from that of the engine 1 according to this embodiment.

BEST MODE FOR CARRYING OUT THE INVENTION

Now, the best mode for carrying out the present invention will be described below in detail, by the way of example, based on the following embodiment while referring to the accompanying drawings. However, it is to be understood that the measurements, materials, configurations, relative arrangements and the like of component parts described in the following embodiment should not be construed as limiting the scope of the present invention in any manner, in particular unless specified otherwise.

Embodiment 1

Figure 1:
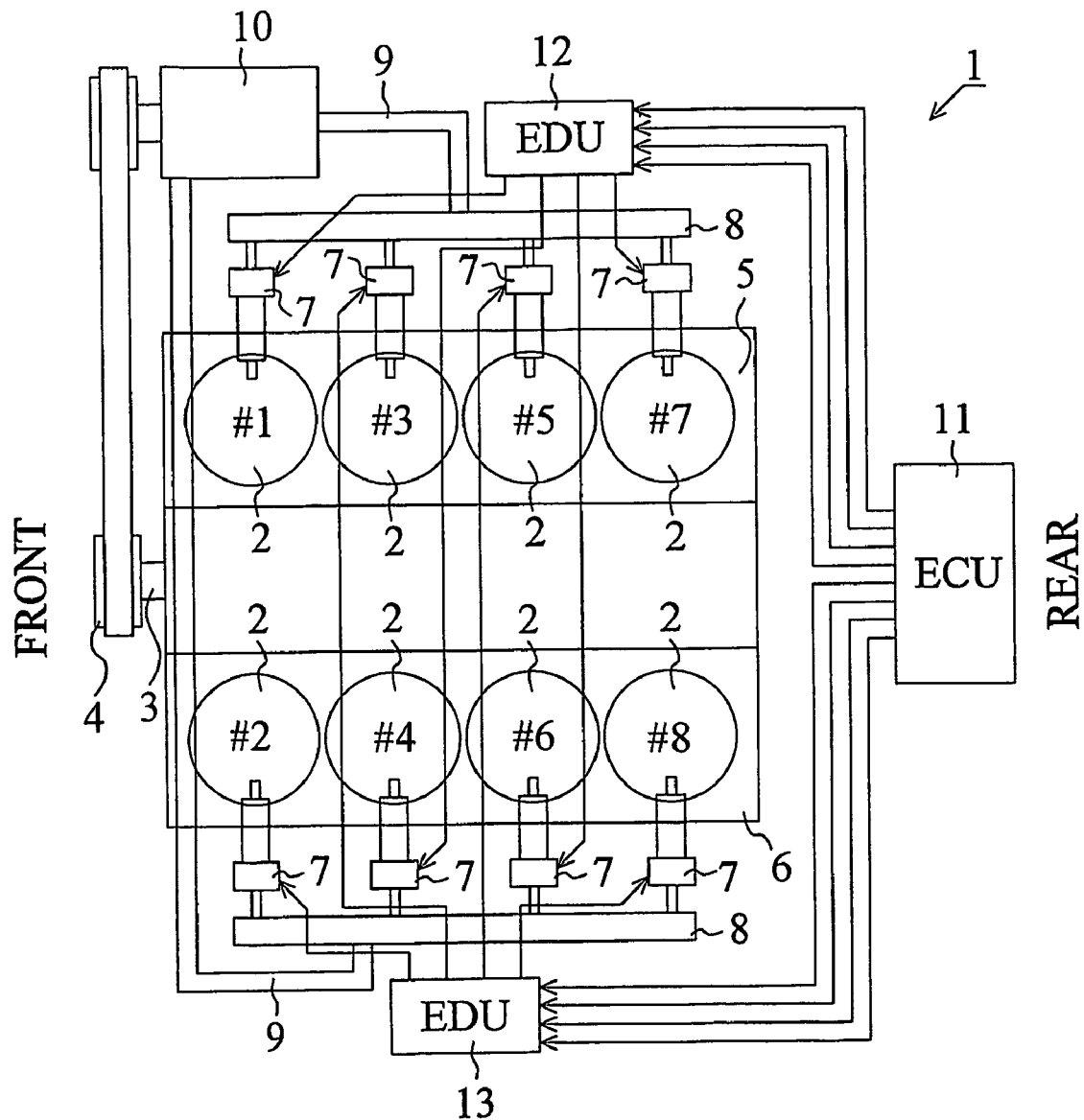
FIG. 1 is a view showing the schematic construction of a V-type eight-cylinder engine according to one embodiment of the present invention.

The schematic construction of a four-cycle diesel engine 1 according to one embodiment of the present invention is illustrated in FIG. 1. The engine 1 is an engine in which when each four of eight cylinders 2 are put into one cylinder group, two cylinder groups are arranged in a V-shaped configuration, with the cylinders being distributed to the left and right sides of a crankshaft 3.

In usual, assuming that the side of a crank pulley 4 is a front side and a coupling surface side of a transmission is a rear side, one group of cylinders which are arranged on the left side when viewed from the front side is referred to as a left bank 5, and the other group of cylinders which are arranged on the right side when viewed from the front side is referred to as a right bank 6. In addition, the number of each cylinder is defined in such a manner that the cylinders are referred to, from the front side of the left bank 5, as the first cylinder (#1), the third cylinder (#3), the fifth cylinder (#5) and the seventh cylinder (#7), respectively, and from the front side of the right bank 6, as the second cylinder (#2), the fourth cylinder (#4), the sixth cylinder (#6) and the eighth cylinder (#8), respectively.

The engine 1 is provided with fuel injection valves 7, each of which serves to directly inject fuel into the combustion chamber of a corresponding cylinder. These fuel injection valves 7 each serve as an actuator that moves up and down a needle valve in a nozzle by the magnetic excitation action of a solenoid thereby to switch between injection and stop. Also, each fuel injection valve 7 is connected with a common rail 8, and this common rail 8 is in fluid communication through a fuel feed pipe 9 with a fuel pump 10.

An electronic control unit (ECU) 11 for controlling the engine 1 is provided in conjunction with the engine 1. This ECU 11 comprises an arithmetic logic operational circuit including a CPU, a ROM, a RAM, a backup RAM, etc.

Various kinds of sensors such as an airflow meter, an air-fuel ratio sensor, an exhaust gas temperature sensor, a crank position sensor, an accelerator position sensor (all unillustrated), and so on are connected to the ECU 11 through electric wiring, so that the output signals of these sensors are input to the ECU 11.

In addition, two fuel injection valve drive units (hereinafter referred to as "EDUs (=Electronic Driver Unit)") 12, 13, which are provided in the vicinity of the banks, respectively, for generating a high voltage, are connected to the ECU 11 through electric wiring, and these EDUs 12, 13 are also connected to the fuel injection valves 7 through electric wiring. The valve-opening and valve-closing timings of the fuel injection valves 7 are controlled by the EDUs 12, 13 on the basis of the fuel injection control of the ECU 11.

The ECU 11 executes inputs of output signals from the variety of kinds of sensors, arithmetic calculations of the number of revolutions per minute of the engine, etc., in a basic routine which is to be executed at regular time intervals. The various kinds of signals input to the ECU 11 and various control values obtained by the calculations of the ECU 11 in the basic routine are temporarily stored in the RAM of the ECU 11.

The ECU 11 reads out various control values from the RAM in interrupt processing which is triggered by the inputs of signals from the variety of sensors and switches, the elapse of a prescribed time, the input of a pulse signal from the crank position sensor, etc., and executes fuel injection control in which an arithmetic calculation of the amount of fuel to be injected, an arithmetic calculation of the fuel injection timing and the like are carried out.

Figure 9:
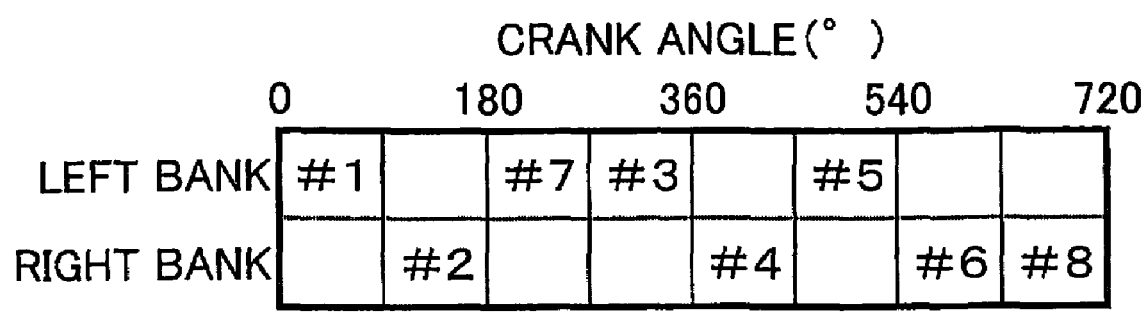
FIG. 9 is a view showing one example of an combustion and expansion sequence of the V-type eight-cylinder engine.

Here, note that the engine 1 adopts a bank angle of 90° so as to adjust the intervals of combustion and expansion according to a main injection to be equal. In addition, in order to counteract secondary vibrations of the engine 1, an arrangement of crank pins adopts a two-plane type in which four crank pins are arranged at intervals of 90°. The starting sequence of the combustion and expansion stroke (combustion and expansion sequence) in the V-type eight-cylinder engine 1 with the crankshaft of such a two-plane type is set to be #1→#2→#7→#3→#4→#5→#6→#8, and the combustion and expansion interval according to the main injection is adjusted to 90°, as shown in FIG. 9.

When this combustion and expansion sequence is seen for the right bank and the left bank, respectively, the combustion and expansion sequence on the left bank 5 becomes #1→#7→#3→#5, and the combustion and expansion interval becomes 180°→90°→180°→270°, whereas the combustion and expansion sequence on the right bank 6 becomes #2→#4→#6→#8, and the combustion and expansion interval becomes 270°→180°→90°→180°. In this manner, the combustion and expansion interval does not become equal when seen separately on each of the right and left banks.

Figure 8:
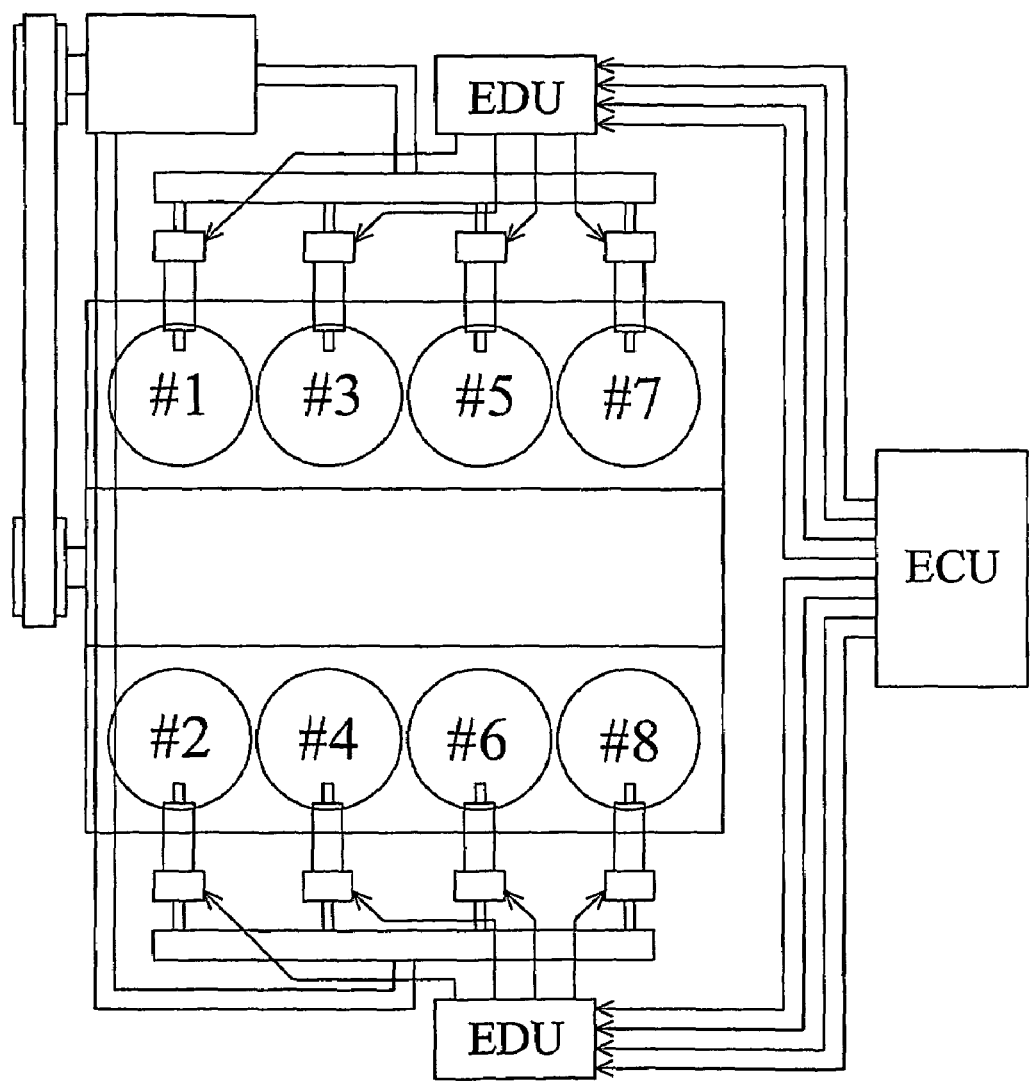
FIG. 8 is a view showing the schematic construction of a V-type eight-cylinder engine different from the V-type eight-cylinder engine according to this embodiment.

Therefore, in case where the EDU 12 arranged in the vicinity of the left bank is connected to cylinders #1, #3, #5 and #7 on the left bank, and the EDU 13 arranged in the vicinity of the right bank is connected to cylinders #2, #4, #6 and #8 on the right bank, as shown in FIG. 8, when a post-injection and a VIGOM-injection in addition to the main injection are carried out by the fuel injection valves 7, the interval of energization from the EDUs 12, 13 to the fuel injection valves 7 becomes short, so it might not be able to ensure sufficient time to charge the EDUs 12, 13. For example, when the number of revolutions per minute of the engine is 4000 rpm, the crankshaft makes one revolution in 15 ms. Accordingly, assuming that the interval of the main injection is 180°, the energization interval for such a main injection becomes 7.5 ms or less, and if the main injection interval is 90°, the energization interval becomes 3.75 ms or less.

Figure 10:
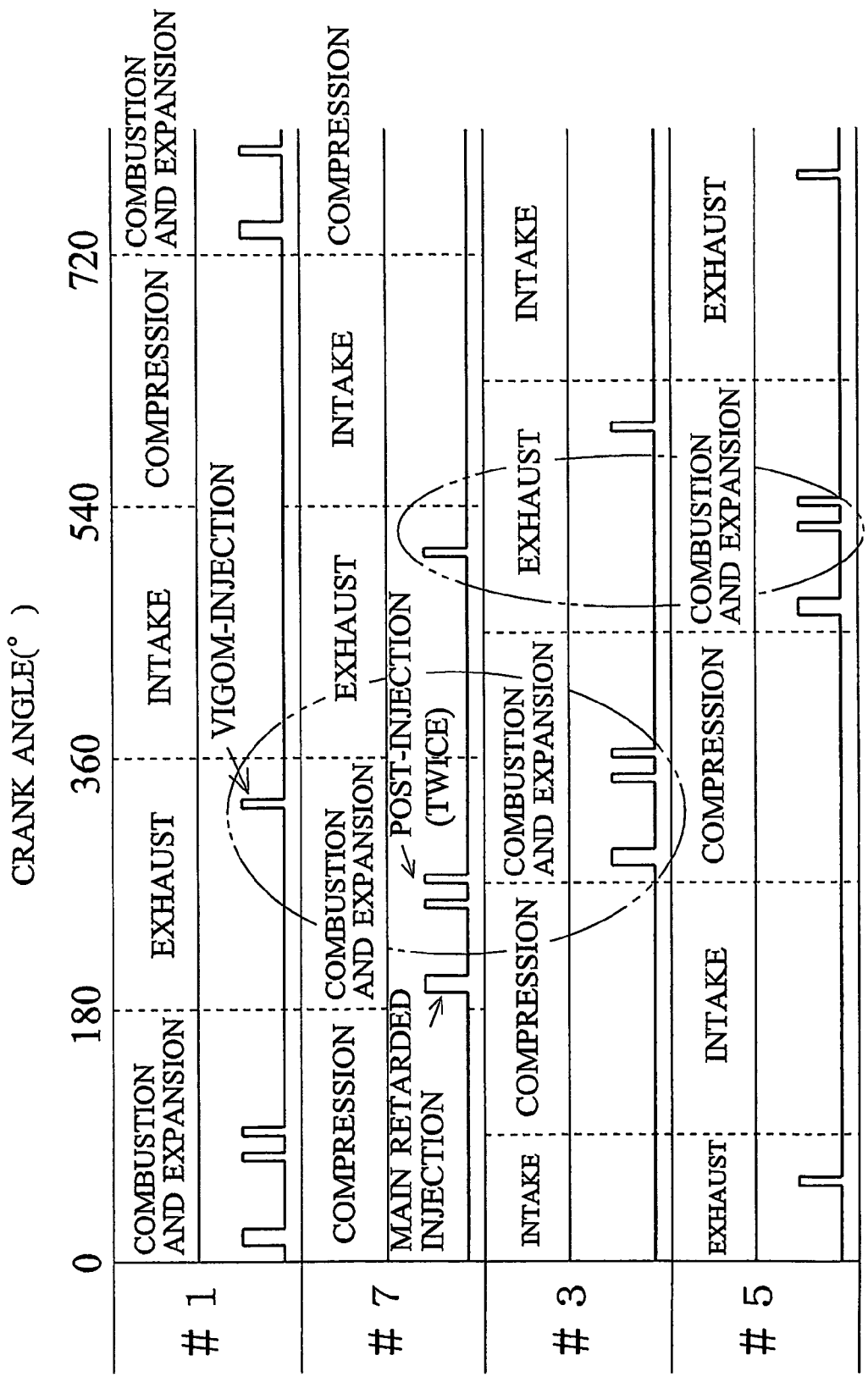
FIG. 10 is a view illustrating drive pulses output from an EDU to fuel injection valves shown in FIG. 8.

FIG. 10 illustrates drive pulses output from the EDU 12 to fuel injection valves 7 when the post-injection and the VIGOM-injection are executed in addition to the main retarded injection, and it can be seen that the energization interval becomes considerably short, as in an area indicated by an alternate long and two short dashes line. Thus, it becomes difficult to ensure a sufficient charging time in a period of time indicated by the alternate long and two short dashes line, so injection precision might be deteriorated, or injection timing might be restricted so as to increase the energization interval thereby to provide a sufficient charging time. In particular, these problems become remarkable when the number of revolutions per minute of the engine is high.

For the purpose of information, a drive current from each EDU necessary to open each fuel injection valve according to this embodiment is about 8.5 amperes, and a charging time necessary for each EDU to become able to supply the current from a complete empty state is about 3 ms at a voltage of 11 volts.

In the engine 1 according to this embodiment, by focusing attention on the fact that the combustion and expansion stroke starts at an equal interval of 180° when the cylinders are divided and sequenced into #1→#7→#4→#6, and #2→#3→#5→#8, respectively, the EDU 12 is connected to those fuel injection valves 7 which are provided on cylinders #1, #4, #6 and #7, whereas the EDU 13 is connected to those fuel injection valves 7 which are provided on cylinders #2, #3, #5 and #8, as shown in FIG. 1.

Figure 2:
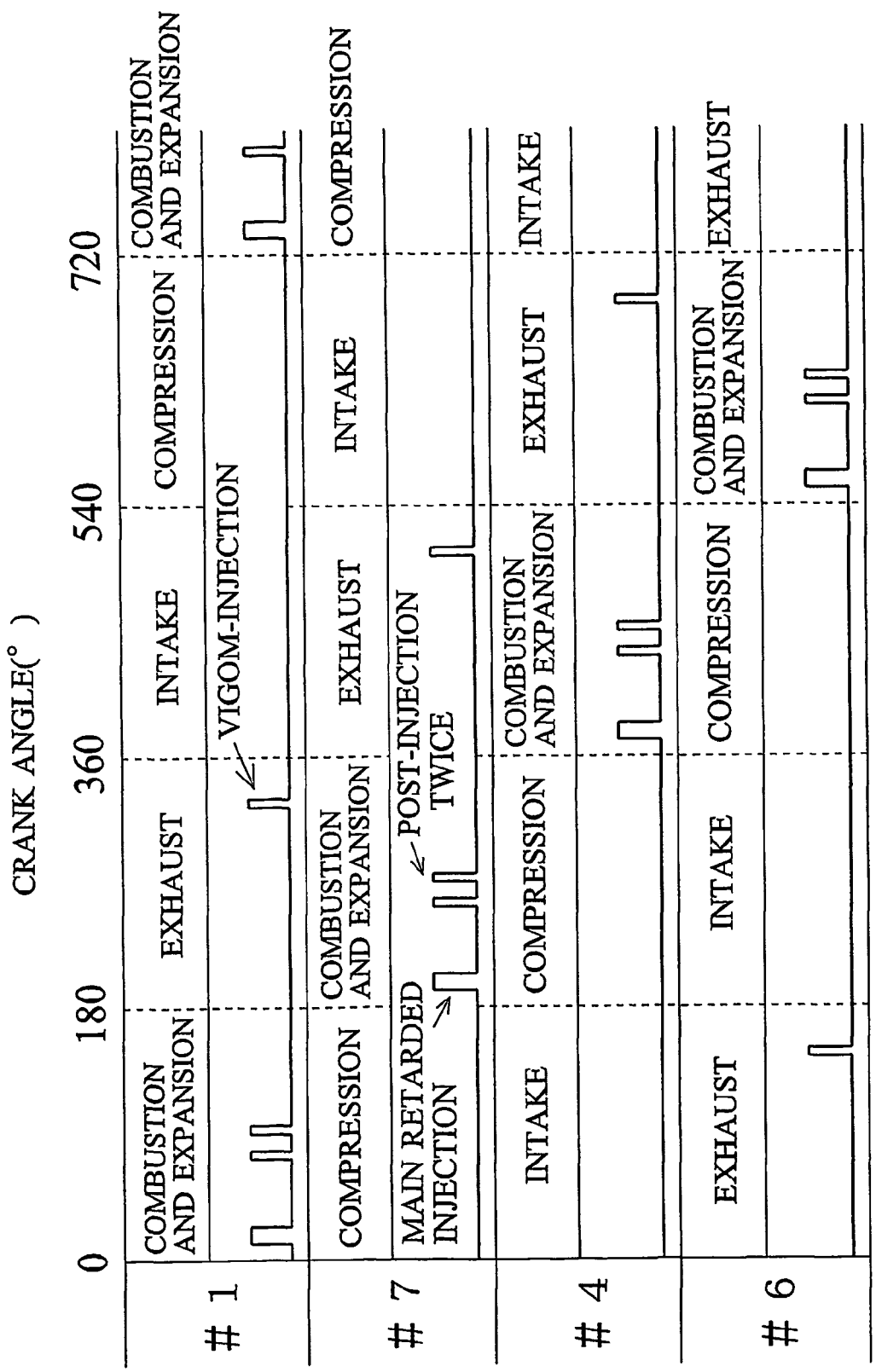
FIG. 2 is a view illustrating drive pulses output from an EDU 12 shown in FIG. 1 to fuel injection valves.
Figure 7:
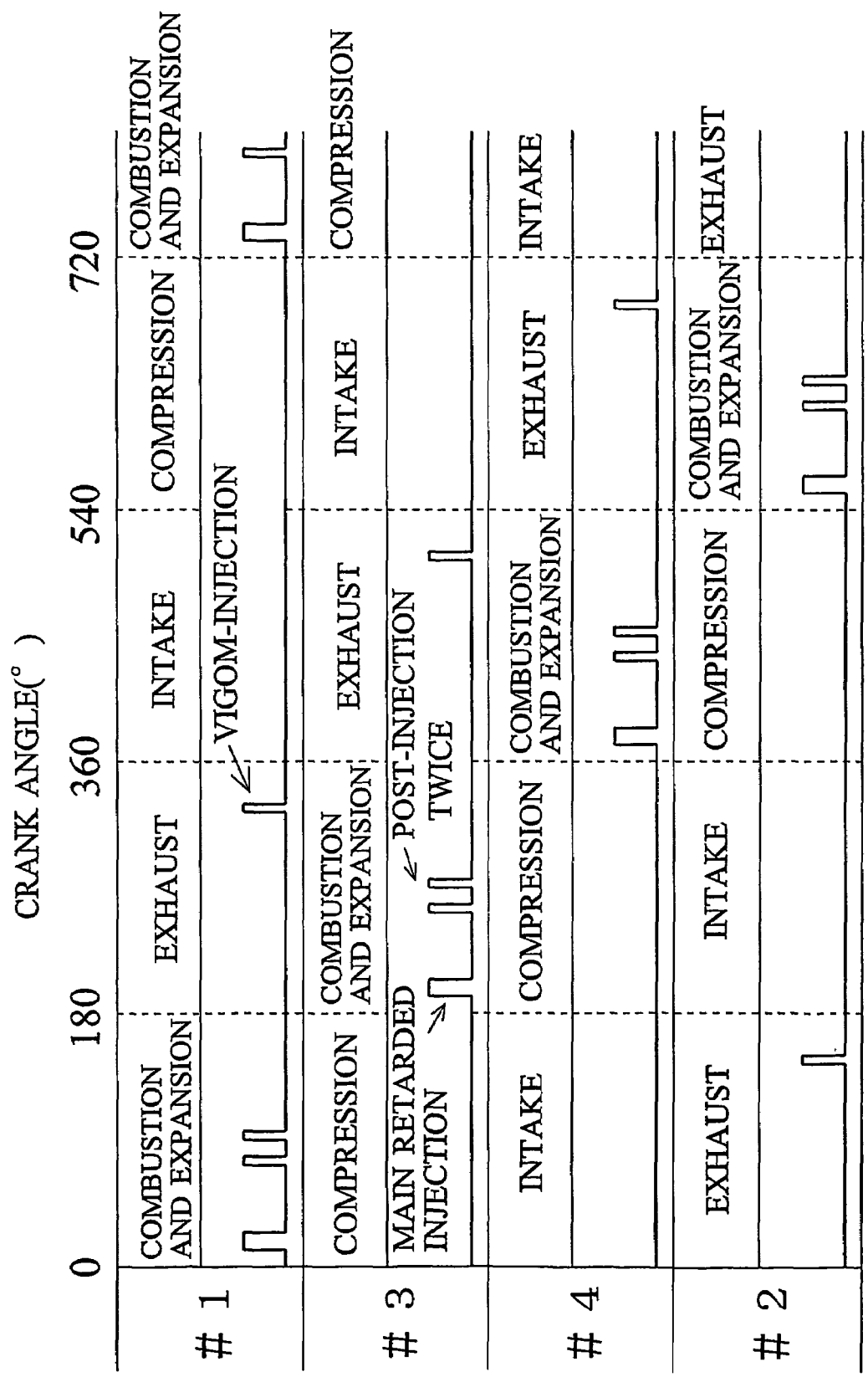
FIG. 7 is a view illustrating drive pulses output from an EDU to fuel injection valves in an in-line four-cylinder engine.

FIG. 2 illustrates drive pulses output from the EDU 12 to fuel injection valves 7 when a post-injection and a VIGOM-injection are carried out in addition to a main retarded injection in such an arrangement. The drive pulses illustrated in this figure are the same as those in the case of the in-line four cylinders shown in FIG. 7, and the energization interval becomes longer in comparison with the case of FIG. 10. As a result, it is possible to prevent deterioration in injection precision and to improve the degree of freedom of the fuel injection timing as well. In addition, since the combustion and expansion stroke is the same as that in an inline four-cylinder engine in which the combustion and expansion stroke starts at an equal interval of 180°, it is possible to use the same program for energization timing as the one used in the inline four-cylinder engine.

Although there has been exemplified, as the engine 1 according to this embodiment, one in which the starting sequence of the combustion and expansion stroke (combustion and expansion sequence) is #1→#2→#7→#3→#4→#5→#6→#8, and the combustion and expansion interval is 90°, there may be a case, depending upon the specification of an engine, in which the starting sequence of the combustion and expansion stroke (combustion and expansion sequence) is set as #1→#8→#4→#3→#6→#5→#7→#2, and the combustion and expansion interval is set as 90°, as shown in FIG. 3. In such a case, when the combustion and expansion sequence of such a specification is seen for the right and left banks, respectively, the combustion and expansion sequence on the left bank 5 becomes #1→#3→#5→#7, and the combustion and expansion interval becomes 270°→180°→90°→180°, whereas the combustion and expansion sequence on the right bank 6 becomes #8→#4→#6→#2, and the combustion and expansion interval becomes 90°→180°→270°→180°. In this manner, the combustion and expansion interval does not become equal when seen separately on each of the right and left banks. On the other hand, when the cylinders are divided and sequenced into #1→#4→#6→#7, and #8→#3→#5→#2, respectively, the combustion and expansion stroke starts at an equal interval of 180°.

Accordingly, in such a specification, too, the EDU 12 is connected to those fuel injection valves 7 which are provided on cylinders #1, #4, #6 and #7, whereas the EDU 13 is connected to those fuel injection valves 7 which are provided on cylinders #2, #3, #5 and #8, as shown in FIG. 1. As a result, the energization interval can be ensured to a satisfactory extent, so injection precision can be prevented from being deteriorated, and the degree of freedom of the fuel injection timing can also be improved. In addition, since the combustion and expansion stroke is the same as that in an inline four-cylinder engine, it is possible to use the same program for energization timing as the one used in the inline four-cylinder engine.

Further, there may be a case, depending upon the specification of an engine, in which the starting sequence of the combustion and expansion stroke (combustion and expansion sequence) is set as #1→#8→#7→#2→#6→#5→#4→#3, as shown in FIG. 4. In such a case, when the combustion and expansion sequence of such a specification is seen for the right and left banks, respectively, the combustion and expansion sequence on the left bank 5 becomes #1→#7→#5→#3, and the combustion and expansion interval becomes 180°→270°→180°→90°, and the combustion and expansion sequence on the right bank 6 becomes #8→#2→#6→#4, and the combustion and expansion interval becomes 180°→90°→180°→270°. In this manner, the combustion and expansion interval does not become equal when seen separately on each of the right and left banks. On the other hand, when the cylinders are divided and sequenced into #1→#7→#6→#4, and #8→#2→#5→#3, respectively, the combustion and expansion stroke starts at an equal interval of 180°.

Accordingly, in such a specification, too, the EDU 12 is connected to those fuel injection valves 7 which are provided on cylinders #1, #4, #6, and #7, whereas the EDU 13 is connected to those fuel injection valves 7 which are provided on #2, #3, #5, and #8, as shown in FIG. 1. Consequently, similar effects as referred to above can be achieved.

Furthermore, there may be a case, depending upon the specification of an engine, in which the starting sequence of the combustion and expansion stroke (combustion and expansion sequence) is set as #1→#8→>#7→#3→#6→#5→#4→#2, as shown in FIG. 5. In such a case, when the combustion and expansion sequence of such a specification is seen for the right and left banks, respectively, the combustion and expansion sequence on the left bank 5 becomes #1→#7→#3→#5, and the combustion and expansion interval becomes 180°→90°→180°→270°→, and the combustion and expansion sequence on the right bank 6 becomes #8→#6→#4→#2, and the combustion and expansion interval becomes 270°→180°→90°→180°. In this manner, the combustion and expansion interval does not become equal when seen separately on each of the right and left banks. On the other hand, when the cylinders are divided and sequenced into #1→#7→#6→#4, and #8→#3→#5→#2, respectively, the combustion and expansion stroke starts at an equal interval of 180°.

Accordingly, in such a specification, too, the EDU 12 is connected to those fuel injection valves 7 which are provided on cylinders #1, #4, #6, and #7, whereas the EDU 13 is connected to those fuel injection valves 7 which are provided on cylinders #2, #3, #5, and #8, as shown in FIG. 1. Thus, similar effects as described above can be achieved.

In addition, there may be a case, depending upon the specification of an engine, in which the starting sequence of the combustion and expansion stroke (combustion and expansion sequence) is set as #1→#5→#4→#3→#6→#8→#7→#2, as shown in FIG. 6. In such a case, when the combustion and expansion sequence of such a specification is seen for the right and left banks, respectively, the combustion and expansion sequence on the left bank 5 becomes #1→#5→#3→#7, and the combustion and expansion interval becomes 90°→180°→270°→180°, whereas the combustion and expansion sequence on the right bank 6 becomes #4→#6→#8→#2, and the combustion and expansion interval becomes 180°→90°→180°→270°. In this manner, the combustion and expansion interval does not become equal when seen separately on each of the right and left banks. On the other hand, when the cylinders are divided and sequenced into #1→#4→#6→#7, and #5→#3→#8→#2, respectively, the combustion and expansion stroke starts at an equal interval of 180°.

Accordingly, in such a specification, too, the EDU 12 is connected to those fuel injection valves 7 which are provided on cylinders #1, #4, #6, and #7, whereas the EDU 13 is connected to those fuel injection valves 7 which are provided on #2, #3, #5, and #8, as shown in FIG. 1. As a result, similar effects as referred to above can be achieved.

While the invention has been described in terms of a preferred embodiment, those skilled in the art will recognize that the invention can be practiced with modifications within the spirit and scope of the appended claims.

INDUSTRIAL APPLICABILITY

Although in this embodiment, a diesel engine is used as the engine 1, it is needless to say that the present invention can also be applied to the case where the engine 1 is a gasoline engine in which fuel is directly injected into cylinders.

The invention claimed is:

1. An eight-cylinder engine in which when four cylinders are put into one cylinder group, two cylinder groups are arranged in a V-shaped configuration with fuel injection valves being provided for injecting fuel into the cylinders, respectively, in case where those cylinders which belong to one of said two cylinder groups are referred to, from one end to the other end, as a first cylinder, a third cylinder, a fifth cylinder and a seventh cylinder, and those cylinders which belong to the other of said two cylinder groups are referred to, from one end to the other end, as a second cylinder, a fourth cylinder, a sixth cylinder and an eighth cylinder, characterized by comprising:

a first valve drive unit for driving those fuel injection valves to open and close which are provided on the first cylinder, the fourth cylinder, the sixth cylinder and the seventh cylinder by energizing these fuel injection valves; and a second valve drive unit for driving those fuel injection valves to open and close which are provided on the second cylinder, the third cylinder, the fifth cylinder and the eighth cylinder by energizing these fuel injection valves.

* * * * *